US012087216B2

(12) United States Patent
Chiou et al.

(10) Patent No.: US 12,087,216 B2
(45) Date of Patent: Sep. 10, 2024

(54) ORGANIC LIGHT-EMITTING DIODE (OLED) DISPLAY DEVICE SOLVING PROBLEM OF UNEVEN LIGHT DISPLAY

(71) Applicant: Raydium Semiconductor Corporation, Hsinchu (TW)

(72) Inventors: Yuhe Chiou, Hsinchu (TW); Shih Hsun Huang, Taipei (TW); Shao-Ping Hung, Hsinchu (TW)

(73) Assignee: RAYDIUM SEMICONDUCTOR CORPORATION, Hsinchu (TW)

( * ) Notice: Subject to any disclaimer, the term of this patent is extended or adjusted under 35 U.S.C. 154(b) by 104 days.

(21) Appl. No.: 17/823,528

(22) Filed: Aug. 31, 2022

(65) Prior Publication Data

US 2023/0072388 A1 Mar. 9, 2023

Related U.S. Application Data

(60) Provisional application No. 63/241,571, filed on Sep. 8, 2021.

(51) Int. Cl.
*G09G 3/3208* (2016.01)

(52) U.S. Cl.
CPC ... *G09G 3/3208* (2013.01); *G09G 2320/0233* (2013.01); *G09G 2320/046* (2013.01); *G09G 2320/0626* (2013.01); *G09G 2330/023* (2013.01)

(58) Field of Classification Search
CPC .......... G09G 3/30; G09G 3/32; G09G 3/3208; G09G 3/3216; G09G 3/3225; G09G 3/3233; G09G 3/3241; G09G 3/325; G09G 3/3258; G09G 3/3266; G09G 3/3275; G09G 3/3283; G09G 3/3291; G09G 2320/0233; G09G 2320/046; G09G 2320/048; G09G 2320/0626
USPC ...................................................... 345/76–83
See application file for complete search history.

(56) References Cited

U.S. PATENT DOCUMENTS

| | | | | |
|---|---|---|---|---|
| 2007/0008251 A1* | 1/2007 | Kohno | G09G 3/3233 | 345/76 |
| 2007/0103411 A1* | 5/2007 | Cok | G09G 3/3225 | 345/82 |
| 2008/0297540 A1* | 12/2008 | Yamada | G09G 3/3208 | 345/690 |
| 2011/0032264 A1* | 2/2011 | Ietomi | G09G 3/3233 | 345/559 |

(Continued)

*Primary Examiner* — Ke Xiao
*Assistant Examiner* — Nelson Lam
(74) *Attorney, Agent, or Firm* — McClure, Qualey & Rodack, LLP

(57) ABSTRACT

An organic light-emitting diode (OLED) display device and an operating method thereof are disclosed. The OLED display device includes an OLED panel, a non-volatile memory and a volatile memory. The non-volatile memory is coupled to the OLED panel and used for storing accumulated current data from the OLED panel. The volatile memory is coupled between the non-volatile memory and the OLED panel and used for storing a compensation value generated according to the accumulated current data stored in the non-volatile memory. When the OLED panel is directly compensated with the compensation value, the non-volatile memory receives and stores updated accumulated current data of the OLED panel.

11 Claims, 6 Drawing Sheets

(56) References Cited

U.S. PATENT DOCUMENTS

| | | | | |
|---|---|---|---|---|
| 2011/0050744 | A1* | 3/2011 | Kikuta ................. | G09G 3/3233<br>345/690 |
| 2013/0241811 | A1* | 9/2013 | White .................. | G09G 3/3208<br>345/77 |
| 2014/0168039 | A1* | 6/2014 | Kim ..................... | G09G 3/3208<br>345/82 |
| 2014/0168192 | A1* | 6/2014 | Jeong ................... | G09G 3/3208<br>345/82 |
| 2014/0320475 | A1* | 10/2014 | Shin ..................... | G09G 3/3275<br>345/82 |
| 2015/0325172 | A1* | 11/2015 | Koyama .............. | G09G 3/3233<br>345/76 |
| 2016/0055791 | A1* | 2/2016 | Kishi ................... | G09G 3/3241<br>345/212 |
| 2016/0148564 | A1* | 5/2016 | Kim ..................... | G09G 3/3233<br>345/82 |

* cited by examiner

| | Compensation unit 25 | Updating unit 23 | Backup unit 24 |
|---|---|---|---|
| Power-on stage S10 | Idle | Idle | On |
| Display stage S12 | On | On | Idle |
| Backup stage S14 | Idle | Idle | On |

| | Compensation unit 65 | Update and backup unit 23 |
|---|---|---|
| Power-on stage S20 | On | Idle |
| Display stage S22 | Idle | Idle |
| Backup stage S24 | Idle | On |

ORGANIC LIGHT-EMITTING DIODE (OLED) DISPLAY DEVICE SOLVING PROBLEM OF UNEVEN LIGHT DISPLAY

BACKGROUND OF THE INVENTION

1. Field of the Invention

The invention relates to a display device; in particular, to an organic light-emitting diode (OLED) display device and an operating method thereof.

2. Description of the Prior Art

In general, after a long-term use of an OLED panel, due to the different display time and brightness of each pixel on the OLED panel, the phenomenon of uneven light decay is caused, which in turn causes the display panel to appear afterimage, which is called “burn-in”.

As shown in FIG. 1, the burn-in compensation technology can achieve a uniform display effect by adjusting the input gray scale, which needs to record the cumulative passing current of each pixel on the OLED panel and use the cumulative current to generate a compensation value to compensate the display screen of the OLED panel.

Please refer to FIG. 2 and FIG. 3. FIG. 2 and FIG. 3 illustrate a functional block diagram of a conventional OLED display device and a flowchart of an operating method thereof respectively.

As shown in FIG. 2, the conventional OLED display device 2 includes an OLED panel 20, a volatile memory 21, a non-volatile memory 22, an updating unit 23, a backup unit 24, a compensation unit 25 and an addition unit 26. The OLED panel 20 is coupled to the updating unit 23 and the compensation unit 25 respectively. The updating unit 23 is coupled between the OLED panel 20 and the addition unit 26. The volatile memory 21 is coupled to the backup unit 24, the compensation unit 25 and the addition unit 26 respectively. The backup unit 24 is coupled between the volatile memory 21 and the non-volatile memory 22. The compensation unit 25 is coupled between the OLED panel 20 and the volatile memory 21.

As shown in FIG. 3, the method of operating the conventional OLED display device 2 can include the following steps:

Step S10 (power-on stage): the backup unit 24 accesses an accumulated current data backed up by the non-volatile memory 22 to the volatile memory 21;

Step S12 (display stage): the compensation unit 25 uses the accumulated current data accessed by the volatile memory 21 to obtain a compensation value to compensate the OLED panel 20 and the updating unit 23 obtains an updated accumulated current data from the OLED panel 20 and store the updated accumulated current data in volatile memory 21; and Step S14 (backup stage): the backup unit 24 backs up the updated accumulated current data stored in the volatile memory 21 to the non-volatile memory 22.

However, since the compensation value for each pixel on the OLED panel 20 is different, it needs to be recorded pixel by pixel, so that the amount of accumulated current data stored in the volatile memory 21 and the number of times of reading and writing are greatly increased, resulting in a substantial increase in system cost and power consumption.

As shown in FIG. 4, the updating unit 23 in the conventional OLED display device 2 needs to calculate the updated accumulated current data of all positions for each frame F1-F7 displayed by the OLED panel 20 and store them in the volatile memory 21. Therefore, as shown in FIG. 5, when the OLED panel 20 is in the display stage (Step S12), the updating unit 23 is always activated to perform operations, resulting in a significant increase in the burden of system computing resources and power consumption.

To sum up, the above-mentioned problems encountered in the prior art still need to be further solved.

SUMMARY OF THE INVENTION

Therefore, the invention provides an organic light-emitting diode (OLED) display device and an operating method thereof to solve the above-mentioned problems of the prior arts.

An embodiment of the invention is an organic light-emitting diode (OLED) display device. In this embodiment, the OLED display device includes an OLED panel, a non-volatile memory and a volatile memory. The non-volatile memory is coupled to the OLED panel and configured to store an accumulated current data from the OLED panel. The volatile memory is coupled between the non-volatile memory and the OLED panel and configured to store a compensation value generated according to the accumulated current data stored in the non-volatile memory. When the OLED panel is directly compensated with the compensation value, the non-volatile memory receives and stores an updated accumulated current data of the OLED panel.

In an embodiment, the OLED display device further includes an update and backup unit. The update and backup unit is coupled between the OLED panel and the non-volatile memory and configured to obtain the accumulated current data of the OLED panel in a first period and store the accumulated current data in the non-volatile memory.

In an embodiment, the update and backup unit also obtains updated accumulated current data of the OLED panel in a second period, and the second period is later than the first period.

In an embodiment, the OLED display device further includes an addition unit. The addition unit is coupled between the update and backup unit and the non-volatile memory and configured to add the updated accumulated current data from the update and backup unit in the second period to the accumulated current data from the non-volatile memory in the first period to replace the accumulated current data originally stored in the non-volatile memory.

In an embodiment, the OLED display device further includes a compensation unit. The compensation unit is coupled between the non-volatile memory and the volatile memory and configured to calculate the compensation value according to the accumulated current data stored in the non-volatile memory and store the compensation value in the volatile memory.

In an embodiment, when obtaining the updated accumulated current data of the OLED panel, the update and backup unit only needs to sample and calculate some sectors to be updated in the non-volatile memory.

In an embodiment, when the compensation unit calculates the compensation value according to the accumulated current data stored in the non-volatile memory and stores the compensation value in the volatile memory, the update and backup unit is in an idle state.

In an embodiment, when the compensation value stored in the volatile memory is used to compensate the OLED panel, the compensation unit and the update and backup unit are in an idle state.

In an embodiment, when the update and backup unit obtain the updated accumulated current data and stores the updated accumulated current data in the non-volatile memory, the compensation unit is in an idle state.

Another preferred embodiment of the invention is an OLED display device operating method. In this embodiment, the OLED display device includes an OLED panel, a volatile memory and a non-volatile memory. The method includes the following steps of: (a) generating a compensation value according to an accumulated current data from the OLED panel stored in the non-volatile memory and storing the compensation value in the volatile memory; (b) directly compensating the OLED panel according to the compensation value stored in the volatile memory; and (c) obtaining an updated accumulated current data from the OLED panel and storing the updated accumulated current data in the non-volatile memory.

In an embodiment, the method further includes the following step of: obtaining the accumulated current data of the OLED panel in a first period and storing the accumulated current data in the non-volatile memory.

In an embodiment, the method further includes the following step of: obtaining the updated accumulated current data of the OLED panel in a second period, wherein the second period is later than the first period.

In an embodiment, the method further includes the following step of: adding the updated accumulated current data in the second period to the accumulated current data from the non-volatile memory in the first period to generate a sum and storing the sum in the non-volatile memory to replace the accumulated current data originally stored in the non-volatile memory.

In an embodiment, the method further includes the following step of: calculating the compensation value according to the accumulated current data stored in the non-volatile memory and storing the compensation value in the volatile memory.

In an embodiment, when obtaining the updated accumulated current data of the OLED panel, the method only needs to sample and calculate some sectors to be updated in the non-volatile memory.

In an embodiment, the OLED display device further includes an update and backup unit and a compensation unit; when the compensation unit calculates the compensation value according to the accumulated current data stored in the non-volatile memory and stores the compensation value in the volatile memory, the update and backup unit is in an idle state.

In an embodiment, the OLED display device further includes an update and backup unit and a compensation unit; when the compensation value stored in the volatile memory is used to compensate the OLED panel, the compensation unit and the update and backup unit are in an idle state.

In an embodiment, the OLED display device further includes an update and backup unit and a compensation unit; when the update and backup unit obtains the updated accumulated current data and stores the updated accumulated current data in the non-volatile memory, the compensation unit is in an idle state.

Compared to the prior art, the OLED display device and the OLED display device operating method proposed by the invention have the following advantages and effects:

(1) since the huge accumulated current data required to de-burn-in is stored in the non-volatile memory, so that the volatile memory only needs to store the compensation value for compensating the OLED panel, so the size of the required volatile memory and the read and write times can be significantly reduced;

(2) since its compensation unit only needs to be activated in the power-on stage and its update and backup units only need to be activated in the backup stage, both are idle in the display stage, thereby the overall power consumption can be effectively reduced; and (3) since the update and backup unit only needs to sample and calculate some sectors to be updated in the non-volatile memory without calculating the updated accumulated current data of all locations, so its computing resources and power consumption can be greatly saved.

The advantage and spirit of the invention may be understood by the following detailed descriptions together with the appended drawings.

BRIEF DESCRIPTION OF THE APPENDED DRAWINGS

DETAILED DESCRIPTION OF THE INVENTION

Figure 1:
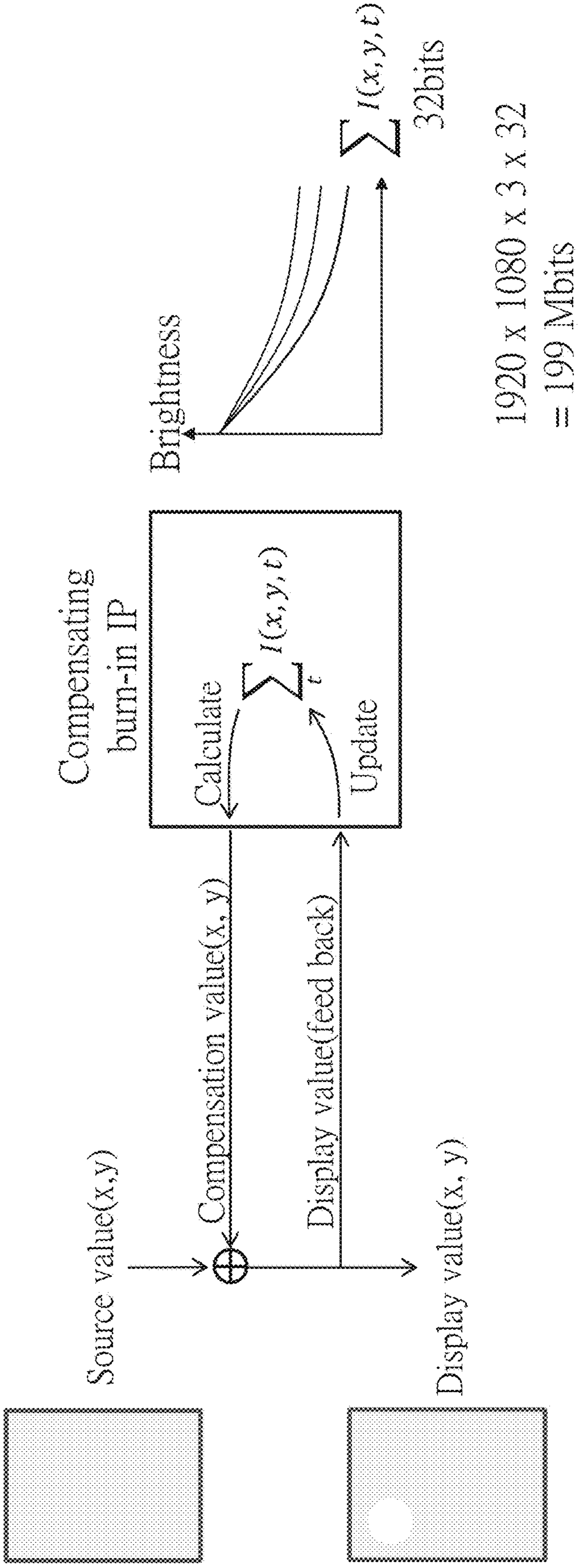
FIG. 1 (Prior art)
FIG. 1 illustrates a schematic diagram that the OLED burn-in compensation technology can achieve uniform display effect by adjusting the input grayscale.
Figure 2:
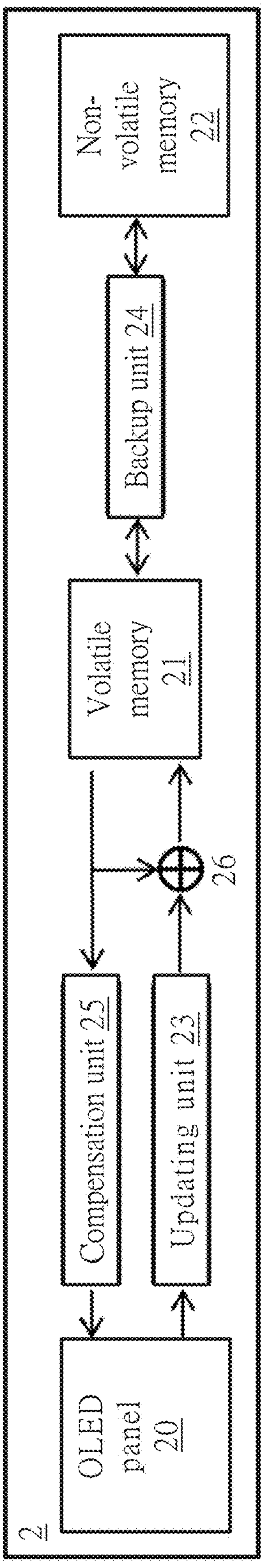
FIG. 2 (Prior art)
FIG. 2 and FIG. 3 illustrate a functional block diagram of the conventional OLED display device and a flowchart of the conventional OLED display device operating method respectively.
Figure 3:
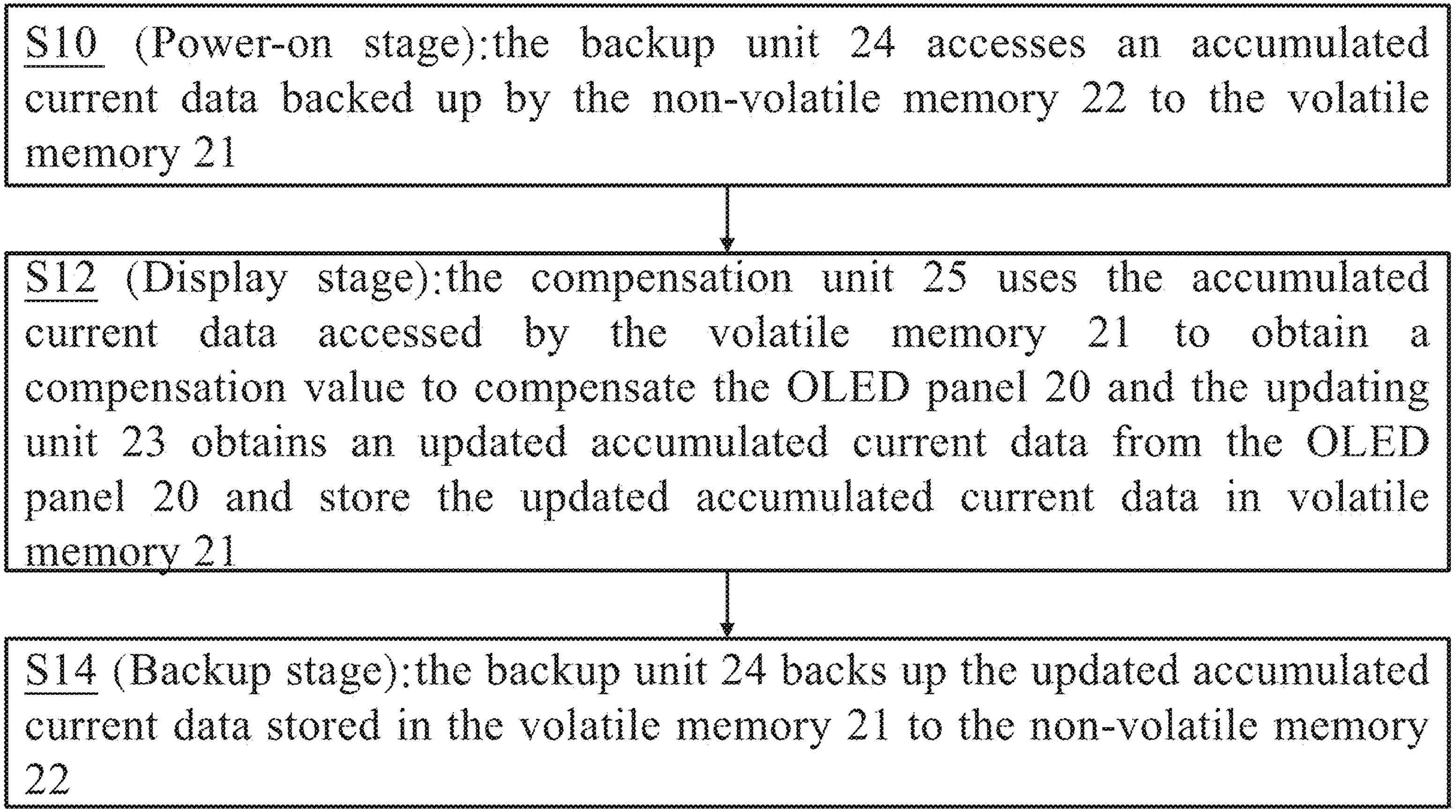
FIG. 3 (Prior art)
Figures 4, 5:
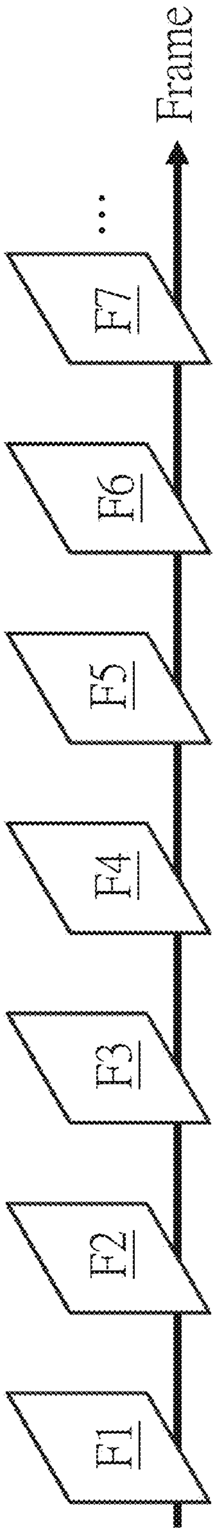
FIG. 4 (Prior art)
FIG. 5 (Prior art)
FIG. 4 illustrates a schematic diagram that the updating unit in the conventional OLED display device needs to calculate the updated accumulated current data of all positions for each frame displayed by the OLED panel and store it in the volatile memory.
FIG. 5 illustrates a schematic diagram that the on/idle states of the updating unit, the backup unit and the compensation unit in the conventional OLED display device at different stages.

Exemplary embodiments of the invention are referenced in detail now, and examples of the exemplary embodiments are illustrated in the drawings. Further, the same or similar reference numerals of the components/components in the drawings and the detailed description of the invention are used on behalf of the same or similar parts.

Figure 6:
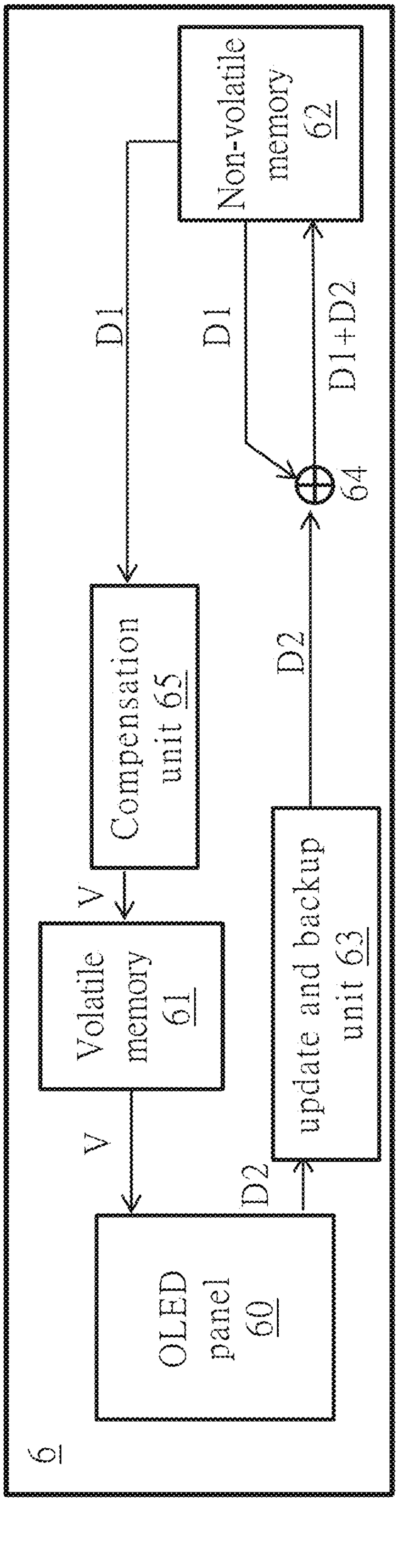
FIG. 6 illustrates a schematic diagram of the OLED display device in a preferred embodiment of the invention.

A preferred embodiment of the invention is an organic light-emitting diode (OLED) display device. In this embodiment, the OLED display device has a function of de-burn-in. Please refer to FIG. 6. FIG. 6 illustrates a schematic diagram of the OLED display device in this embodiment.

As shown in FIG. 6, the OLED display device 6 includes an OLED display panel 60, a volatile memory 61, a non-volatile memory 62, an update and backup unit 63, an addition unit 64 and a compensation unit 65. The OLED display panel 60 is coupled to the volatile memory 61 and the update and backup unit 63 respectively. The update and backup unit 63 is coupled between the OLED display panel 60 and the addition unit 64. The addition unit 64 is coupled between the non-volatile memory 62 and the update and backup unit 63. The non-volatile memory 62 is coupled between the addition unit 64 and the compensation unit 65. The compensation unit 65 is coupled between the volatile memory 61 and the non-volatile memory 62. The volatile memory 61 is coupled between the OLED display panel 60 and the compensation unit 65.

In practical applications, the volatile memory 61 refers to a memory whose stored data will disappear when the power supply is interrupted, such as a static random access memory (SRAM) or dynamic random access memory (DRAM) and other random access memory (RAM), etc., but not limited to this. The non-volatile memory 62 means that when the power supply is interrupted, the data stored in it will not disappear, and the data stored in it can be read after the power supply is restarted, such as flash memory or read-only memory (ROM), etc., but not limited to this.

In this embodiment, the non-volatile memory 62 stores an accumulated current data D1 from the OLED panel 60 in a first period. The compensation unit 65 calculates a compensation value V according to the accumulated current data D1 stored in the non-volatile memory 62 in the first period and stores the compensation value V in the volatile memory 61. The compensation value V stored in the volatile memory 61 is used to directly compensate the OLED panel 60.

When the compensation value V stored in the volatile memory 61 is used to directly compensate the OLED panel 60, the update and backup unit 63 obtains an update accumulated current data D2 from the OLED panel 60 in a second period, wherein the second period is later than the first period. The addition unit 64 adds the updated accumulated current data D2 in the second period from the update and backup unit 63 and the accumulated current data D1 in the first period from the non-volatile memory 62 as a sum D1+D2 and stores the sum D1+D2 in the non-volatile memory 62 to replace the accumulated current data D1 originally stored in the non-volatile memory 62. Next, the OLED display device 6 can repeat the above-mentioned operations, which will not be described in detail here.

Figure 7:
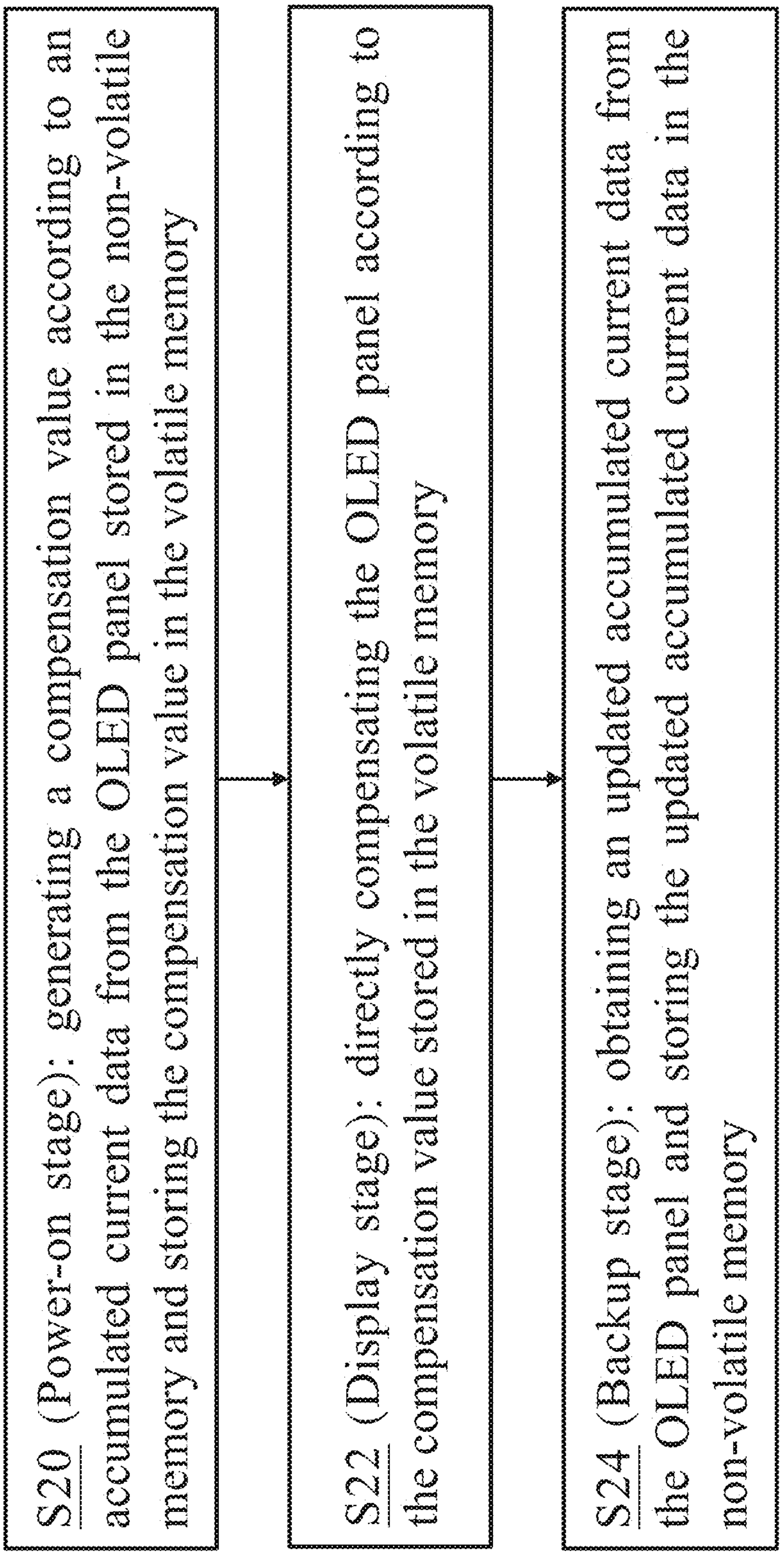
FIG. 7 illustrates a flowchart of the OLED display device operating method in another preferred embodiment of the invention.

Another preferred embodiment of the invention is an OLED display device operating method. In this embodiment, the OLED display device has a function of de-burn-in. The OLED display device includes at least an OLED panel, a volatile memory and a non-volatile memory. Please refer to FIG. 7. FIG. 7 illustrates a flowchart of the OLED display device operating method in this embodiment.

As shown in FIG. 7, the OLED display device operating method can include the following steps:

Step S20 (power-on stage): generating a compensation value according to an accumulated current data from the OLED panel stored in the non-volatile memory and storing the compensation value in the volatile memory;

Step S22 (display stage): directly compensating the OLED panel according to the compensation value stored in the volatile memory; and Step S24 (backup stage): obtaining an updated accumulated current data from the OLED panel and storing the updated accumulated current data in the non-volatile memory.

In practical applications, the method can further include but not limited to the following steps: obtaining the accumulated current data of the OLED panel in the first period and storing the accumulated current data in the non-volatile memory; obtaining the updated accumulated current data of the OLED panel in the second period, wherein the second period is later than the first period; adding the updated accumulated current data in the second period to the accumulated current data from the non-volatile memory in the first period to generate a sum and storing the sum in the non-volatile memory to replace the accumulated current data originally stored in the non-volatile memory; and calculating the compensation value according to the accumulated current data stored in the non-volatile memory and storing the compensation value in the volatile memory.

Figures 8, 9:
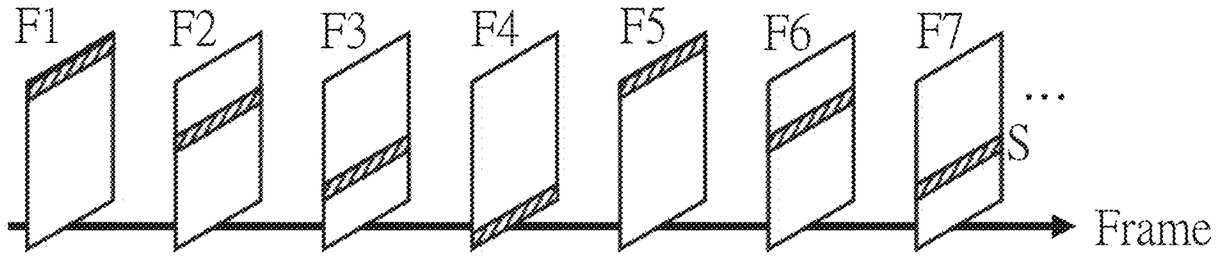
FIG. 8 illustrates a schematic diagram that the update and backup unit in the OLED display device of the invention only needs to sample and calculate some sectors to be updated in the non-volatile memory for each frame displayed by the OLED panel.
FIG. 9 illustrates the on/idle states of the compensation unit and the update and backup unit in the OLED display device of the invention at different stages.

It should be noted that, as shown in FIG. 8, in Step S24 (backup stage), when the update and backup unit 63 obtains the updated accumulated current data D2 of the OLED panel 60, the method only needs to sample and calculate some sectors S to be updated in the non-volatile memory 62 for each frame F1-F7 displayed by the OLED panel 20, instead of calculating the updated accumulated current data of all positions, so its computing resources and power consumption can be greatly saved.

Next, please also refer to FIG. 9. FIG. 9 illustrates the on/idle states of the compensation unit 65 and the update and backup unit 63 in the OLED display device 6 at different stages.

As shown in FIG. 9, in Step S20 (power-on stage), when the compensation unit 65 calculates the compensation value V according to the accumulated current data D1 in the first period and stores the compensation value V in the volatile memory 61, the update and backup unit 63 is in an idle state. In Step S22 (display stage), when the compensation value V stored in the volatile memory 61 is used to compensate the OLED panel 60, the compensation unit 65 and the update and backup unit 63 are in the idle state. In Step S24 (backup stage), when the update and backup unit 63 obtains the updated accumulated current data D2 from the OLED panel 60 in the second period and stores the updated accumulated current data D2 in the non-volatile memory 62, the compensation unit 65 is in the idle state.

Compared to the prior art, the OLED display device and the OLED display device operating method proposed by the invention have the following advantages and effects:

(1) since the huge accumulated current data required to de-burn-in is stored in the non-volatile memory, so that the volatile memory only needs to store the compensation value for compensating the OLED panel, so the size of the required volatile memory and the read and write times can be significantly reduced;

(2) since its compensation unit only needs to be activated in the power-on stage and its update and backup units only need to be activated in the backup stage, both are idle in the display stage, thereby the overall power consumption can be effectively reduced; and (3) since the update and backup unit only needs to sample and calculate some sectors to be updated in the non-volatile memory without calculating the updated accumulated current data of all locations, so its computing resources and power consumption can be greatly saved.

With the example and explanations above, the characteristics and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An organic light-emitting diode (OLED) display device, comprising:

an OLED panel;

a non-volatile memory, coupled to the OLED panel and configured to store an accumulated current data from the OLED panel;

a volatile memory, coupled between the non-volatile memory and the OLED panel and configured to store a compensation value generated according to the accumulated current data stored in the non-volatile memory; and an update and backup circuit, coupled between the OLED panel and the non-volatile memory and configured to obtain the accumulated current data of the OLED panel in a first period and store the accumulated current data in the non-volatile memory;

wherein when the OLED panel is directly compensated with the compensation value, the non-volatile memory receives and stores an updated accumulated current data of the OLED panel; the update and backup circuit also obtains the updated accumulated current data of the OLED panel in a second period later than the first period; when obtaining the updated accumulated current data of the OLED panel, the update and backup circuit only needs to sample and calculate a portion of a frame to be updated in the non-volatile memory.

2. The OLED display device of claim 1, further comprising:

an addition circuit, coupled between the update and backup circuit and the non-volatile memory and configured to add the updated accumulated current data from the update and backup circuit in the second period to the accumulated current data from the non-volatile memory in the first period to generate a sum and storing the sum to the non-volatile memory to replace the accumulated current data originally stored in the non-volatile memory.

3. An organic light-emitting diode (OLED) display device, comprising:

an OLED panel;

a non-volatile memory, coupled to the OLED panel and configured to store an accumulated current data from the OLED panel;

a volatile memory, coupled between the non-volatile memory and the OLED panel and configured to store a compensation value generated according to the accumulated current data stored in the non-volatile memory;

an update and backup circuit, coupled between the OLED panel and the non-volatile memory and configured to obtain the accumulated current data of the OLED panel in a first period and store the accumulated current data in the non-volatile memory; and a compensation circuit, coupled between the non-volatile memory and the volatile memory and configured to calculate the compensation value according to the accumulated current data stored in the non-volatile memory and storing the compensation value in the volatile memory; when the update and backup circuit obtains the updated accumulated current data and stores the updated accumulated current data in the non-volatile memory, the compensation circuit is in an idle state.

4. The OLED display device of claim 3, wherein when the compensation circuit calculates the compensation value according to the accumulated current data stored in the non-volatile memory and stores the compensation value in the volatile memory, the update and backup circuit is in an idle state.

5. The OLED display device of claim 3, wherein when the compensation value stored in the volatile memory is used to compensate the OLED panel, the compensation circuit and the update and backup circuit are in an idle state.

6. A method of operating an OLED display device, the OLED display device comprising an OLED panel, a volatile memory and a non-volatile memory, the method comprising steps of:

(a) generating a compensation value according to an accumulated current data from the OLED panel stored in the non-volatile memory and storing the compensation value in the volatile memory;

(b) directly compensating the OLED panel according to the compensation value stored in the volatile memory; and (c) obtaining an updated accumulated current data from the OLED panel and storing the updated accumulated current data in the non-volatile memory;

wherein the method further comprises steps of:

obtaining the accumulated current data of the OLED panel in a first period and storing the accumulated current data in the non-volatile memory;

obtaining the updated accumulated current data of the OLED panel in a second period, wherein the second period is later than the first period; and adding the updated accumulated current data in the second period to the accumulated current data from the non-volatile memory in the first period to generate a sum and storing the sum in the non-volatile memory to replace the accumulated current data originally stored in the non-volatile memory.

7. The method of claim 6, wherein the method further comprises the step of:

calculating the compensation value according to the accumulated current data stored in the non-volatile memory and storing the compensation value in the volatile memory.

8. The method of claim 7, wherein the OLED display device further comprises an update and backup circuit and a compensation circuit; when the compensation circuit calculates the compensation value according to the accumulated current data stored in the non-volatile memory and stores the compensation value in the volatile memory, the update and backup circuit is in an idle state.

9. The method of claim 6, wherein when obtaining the updated accumulated current data of the OLED panel, the method only needs to sample and calculate a portion of a frame to be updated in the non-volatile memory.

10. The method of claim 7, wherein the OLED display device further comprises an update and backup circuit and a compensation circuit; when the compensation value stored in the volatile memory is used to compensate the OLED panel, the compensation circuit and the update and backup circuit are in an idle state.

11. The method of claim 7, wherein the OLED display device further comprises an update and backup circuit and a compensation circuit; when the update and backup circuit obtains the updated accumulated current data and stores the updated accumulated current data in the non-volatile memory, the compensation circuit is in an idle state.

* * * * *